United States Patent [19]
Piet

[11] Patent Number: 4,719,681
[45] Date of Patent: Jan. 19, 1988

[54] METHOD OF MAKING A FLUID FLOW CONTROLLING SLIDE MEMBER FOR A VALVE BODY

[75] Inventor: Meyer Piet, City of Industry, Calif.

[73] Assignee: Futurecraft Corporation, City of Industry, Calif.

[21] Appl. No.: 6,766

[22] Filed: Jan. 27, 1987

Related U.S. Application Data

[62] Division of Ser. No. 752,553, Jul. 8, 1985, Pat. No. 4,664,151.

[51] Int. Cl.$^4$ .............................................. B21D 53/00
[52] U.S. Cl. .................................. 29/157.1 R; 29/434; 29/DIG.48
[58] Field of Search ................... 29/157.1 R, 157.1 A, 29/434, DIG. 48; 37/625.35, 625.68, 625.69, 625.66

[56] References Cited

U.S. PATENT DOCUMENTS 2,675,831  4/1954  Jacques ..................... 29/157.1 R X
4,030,668  6/1977  Kiwior ...................... 29/157.1 R X
4,512,370  4/1985  Roger ....................... 137/625.68 X Primary Examiner—Howard N. Goldberg
Assistant Examiner—Ronald S. Wallace
Attorney, Agent, or Firm—James E. Brunton

[57] ABSTRACT

A valve assembly and the manner of making the same of the character which embodies a hollow cylindrical body having fluid inlet and outlet ports and a slide member, or spool, slidable within the body to control fluid flow through the valve. Sealing elements are carried by the valve body for sealable engagement with the slide member as it reciprocates within the valve body. The fluid passageways which carry the fluid between the inlet and outlet ports of the valve body are uniquely formed internally of the slide member. Because the slide member is precision ground to a uniform diameter over its entire length, there exists no differing diameters or steps which might abrade the sealing means or tend to cause an inadvertant shifting of the spool within the valve body due to fluid pressures exerted thereon.

3 Claims, 4 Drawing Figures

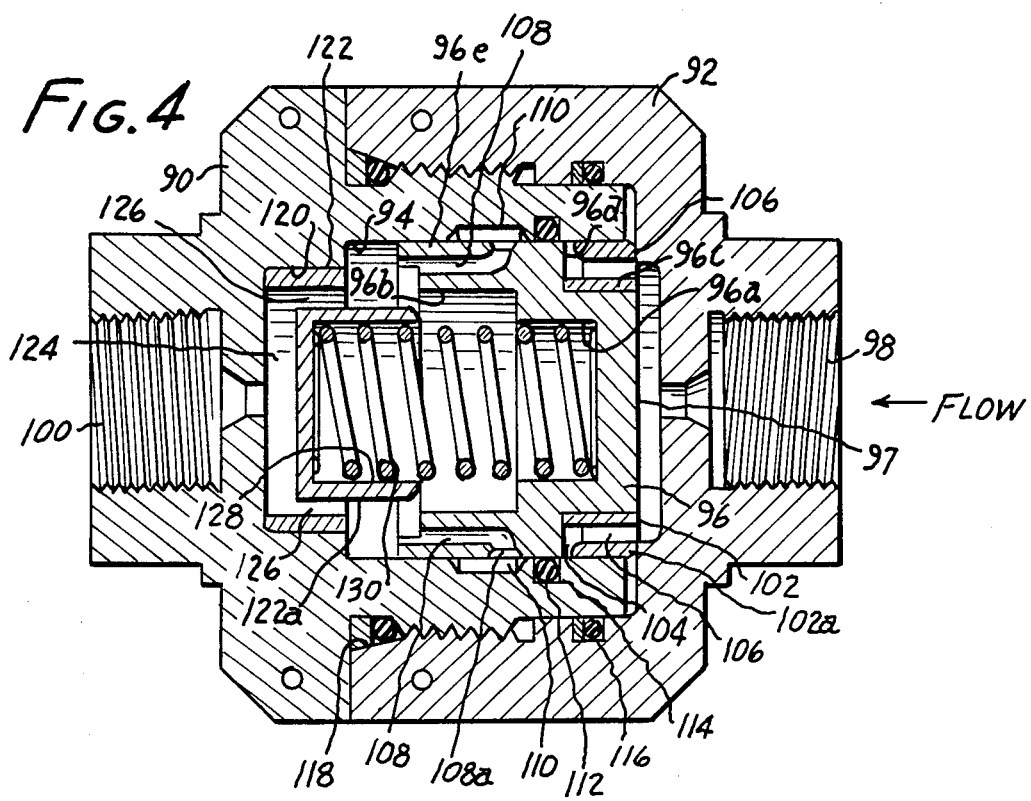
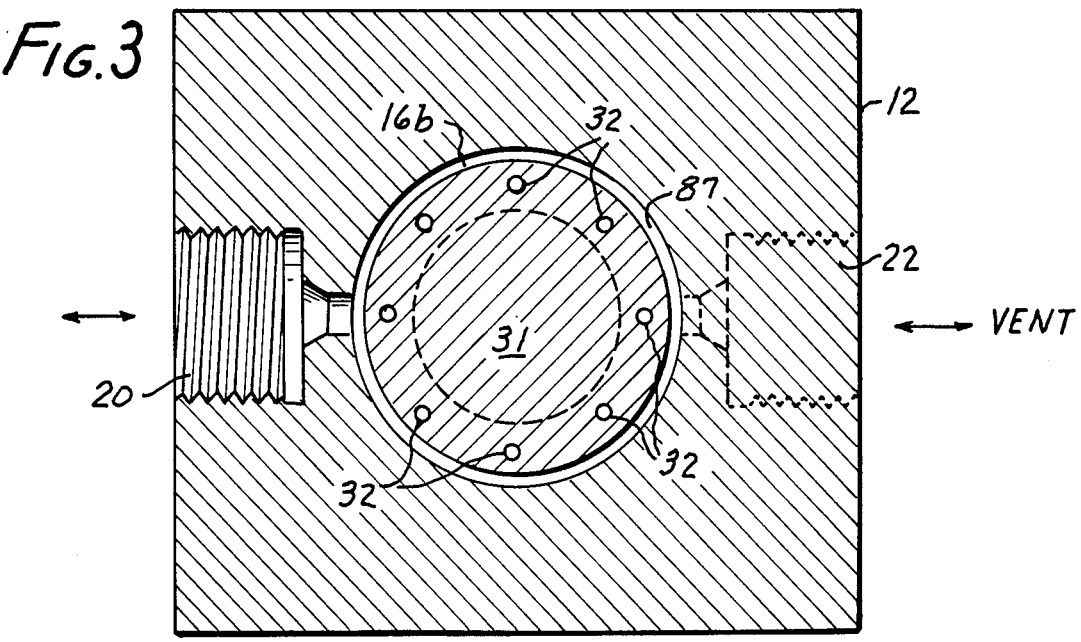

METHOD OF MAKING A FLUID FLOW CONTROLLING SLIDE MEMBER FOR A VALVE BODY

BACKGROUND OF THE INVENTION

This application is a divisional application of copending application Ser. No. 06/752,553, now U.S. Pat. 4,665,151 issued May 12, 1987. Filing date 7-8-85.

1. Field of the Invention

The present invention relates generally to valves for controlling the flow of fluids under pressure. More particularly, the invention concerns a novel valve assembly and the method of making the same which, in the open position, fluid flows from the inlet port of the valve assembly into a very narrow annular passageway formed in a cylindrically shaped valve slide member of spool, thence through a plurality of axially extending passageways formed internally of the slide member and finally into the outlet port of the valve assembly.

1. Discussion of the Prior Art

Numerous types of valve assemblies embodying reciprocally movable slide members exist for controlling the flow of fluids under pressure. These valves may be provided with valve bodies and spools of widely varying configurations and may be pressure or solenoid operated, or they may be operated by pyrotechnic, mechanical or electromechanical devices of specialized design. Similarly, these prior art valve assemblies may embody pressure ports and closure means of widely varying design. However, typical of most prior art valve assemblies of this class, elastomeric O-rings, or comparable sealing devices, are used to prevent undesired flow of fluid between the slide member and the valve body as the slide member is reciprocated. Exemplary of various of the more sophisticated prior art valve designs are those disclosed in U.S. Pat. Nos. 2,791,090 and 3,731,905 issued to the present inventor.

Almost without regard to the particular design features found in a given prior art spool type valve assembly, either the valve body or the spool is stepped or ported to provide a fluid flow path through the valve assembly. While typically the valve body is ported or stepped, in some special purpose applications the spool or poppet may also be stepped. In either case, precision fabrication of valve assemblies of this character is difficult and often quite expensive. Additionally, because there must always be relative movement between the slide member and the valve body, and, accordingly, relevant movement between one or the other of these parts and the sealing means employed, as, for example, one or more elastomeric O-rings, some wear of the sealing means must be expected. In these instances where the O-ring, or other elastomeric sealing means, is repeatedly brought into engagement with a pronounced step, port, flange, or shoulder formed in the valve assembly, substantial damage to the sealing means will unavoidably occur as a function of time. Such wear seriously effects the reliability of the valve and results in continuous and costly maintenance and system downtime.

The unique valve assembly of the present invention effectively overcomes the aforementioned drawbacks of prior art valves by providing a novel, perfectly cylindrical slide member or spool which has internally disposed fluid passageways. During the operation of the valve, this unique slide member engages the sealing means of the valve assembly in a manner so as to virtually eliminate wear on the sealing means. Additionally, because the spool is precision ground to a uniform diameter over its entire length, there exists no differing diameters or steps which might abrade the sealing means or tend to cause an inadvertant shifting of the spool within the valve body due to fluid pressures exerted thereon. Further, because the fluid being controlled by the valve flows internally of the spool, widely varying flow rates can be readily achieved merely by adjusting the spool diameter and the size and number of the internal passageways formed within the spool.

As will be more clearly understood from the description which follows, the present invention enables the cost effective manufacture of precision, high pressure valves which require minimum maintenance, are highly reliable in operation and provide great versatility in use.

SUMMARY OF THE INVENTION

It is an object of the present invention to provide a valve assembly and the manner of making the same of the character which embodies a hollow cylindrical body having fluid inlet and outlet ports and a slide member, or spool, slidable within the body in which the spool is provided with internal fluid passageways for carrying fluid between the fluid inlet and outlet ports when the valve is in an open position.

It is another object of the invention to provide a valve assembly of the aforementioned character in which the hollow body is adapted to carry sealing means engageable by the spool for preventing the flow of fluid between the spool and the valve body.

It is still another object of the invention to provide a valve assembly of the character described in the preceding paragraphs in which the spool is perfectly cylindrical and includes at least one annular groove interconnected with at least one axially extending, internal fluid passageway for carrying fluid under pressure between the inlet and outlet ports.

A further ojbect of the invention is to provide a valve assembly as described in which the spool has no steps, shoulders, or enlarged diameter portions which will abrade the sealing means or upon which fluid under pressure can act to inadvertently shift the spool within the body.

Another object of the invention is to provide a valve assembly of the character described which is highly reliable, can be used in numerous fluid control applications, requires minimum maintenance, can be used to precisely control fluids at very high pressure and is inexpensive to manufacture.

BRIEF DESCRIPTION OF THE DRAWINGS

FIG. 3 is a cross-sectional view taken along lines 3—3 of FIG. 1.

FIG. 4 is a side elevational cross-sectional view of another form of the valve of the present invention.

DESCRIPTION OF THE INVENTION

Figure 1:
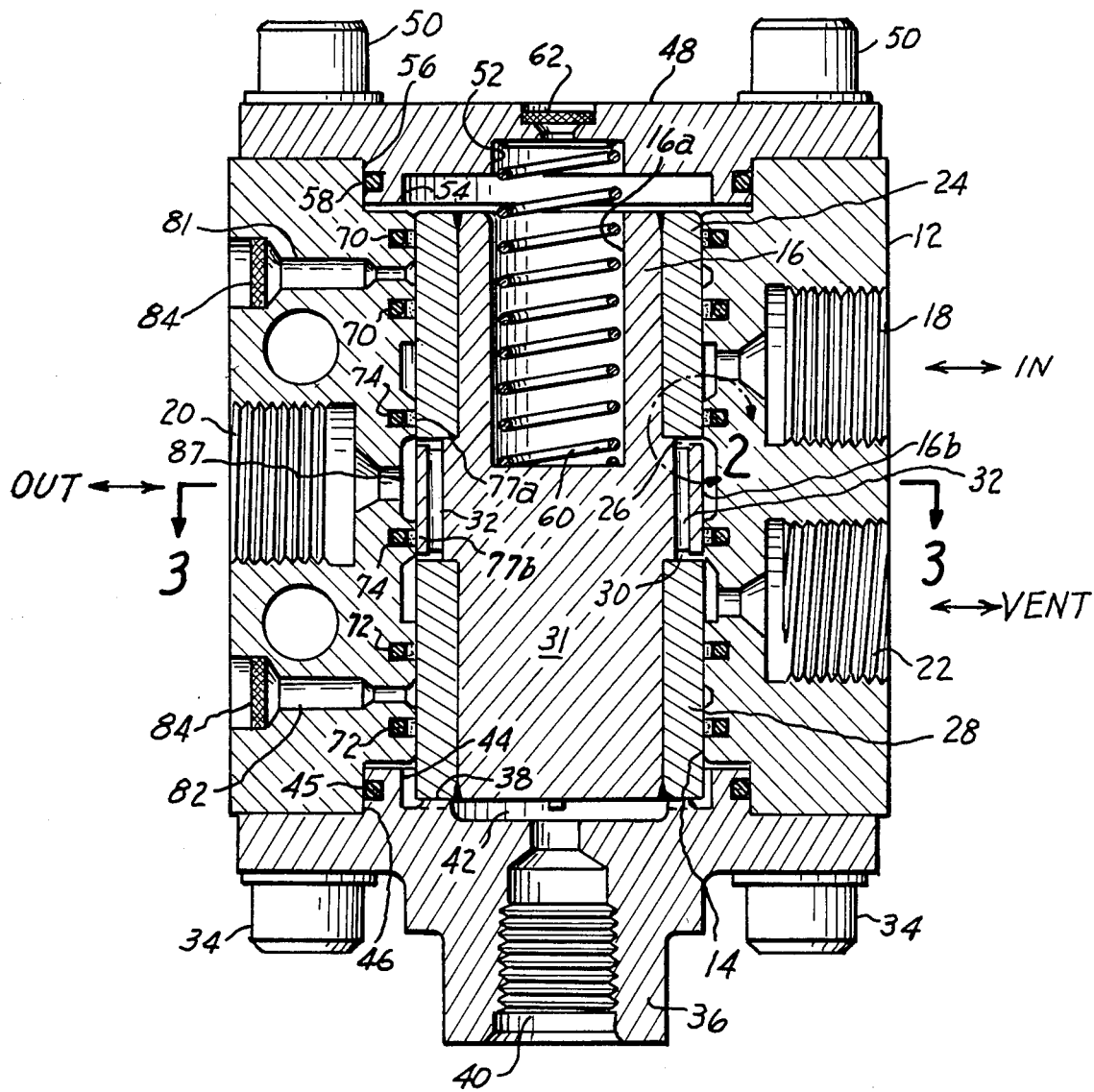
FIG. 1 is a side elevational cross-sectional view of one form of the valve of the present invention.
Figure 2:
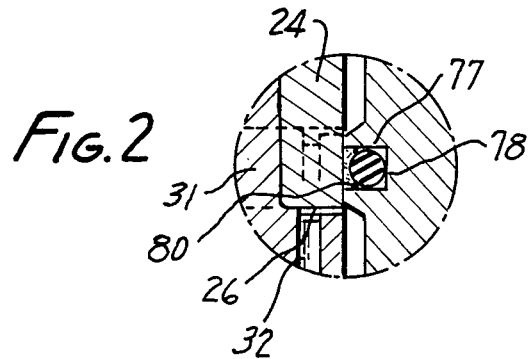
FIG. 2 is an enlarged fragmentary view of the portion identified by the partial circle and the numeral "2" in FIG. 1.

The form of the invention shown in FIGS. 1, 2 and 3 includes a valve body 12 having an axial bore 14 in which a valve item or slide member 16 is operative. The valve body 12 has a laterally directed inlet or pressure passage 18, an outlet or service passage 20 and a vent passage 22 spaced along the axis of bore 14 of the body 12 and in communication therewith. These passages 18, 20 and 22 are formed by walls which are threaded, as shown, for connection to piping or conduit.

The slide member 16 is of round cross section having a counter bore 16a and an enlarged diameter central portion 16b of a diameter only slightly less than the diameter of axial bore 14. Affixed to the upper end of member 16, as by electron beam welding or other suitable means, is a first sleeve 24. The lower end of sleeve 24 is disposed in close proximity with the upper end of enlarged diameter portion 16b of body 16 so as to form an upper, or first, annular, or circumferentially extending, passageway 26 between sleeve 24 and portion 16b. A second sleeve 28 is affixed to the lower end of member 16 as by bonding, welding or other suitable means. The upper end of sleeve 28 is disposed in close proximity with the lower end of enlarged diameter portion 16b of body 16 so as to form a lower, or second annular passageway 30 between sleeve 28 and portion 16b. The outer diameter of sleeves 24 and 28 is identical to the diameter of central portion 16b of slide member 16 so that the assembly 31 which is made up of member 16 and sleeves 24 and 28 is reciprocally movable within bore 14 in close proximity with the inner wall thereof.

A highly novel feature of the invention resides in the provision of a plurality of axially extending, circumferentially spaced apart bores, or passageways 32, extending through a central portion 16b of slide member 16 which passageways interconnect circumferentially extending passageways 26 and 30. These bores, or passageways 32 are formed by drilling central portion 16b prior to the affixing of sleeves 24 and 28 to slide member 16 and, in a manner presently to be described, permit fluid flow between the passages 18, 20 and 22 formed in body 12.

Affixed to the lower end of body 12 by fasteners 34 is a closure member 36. Closure member 36 includes an inner annular shoulder, or stop, 38 adapted to be engaged by assembly 31. Closure member 36 is also provided with a pressure port, or passage, 40 adapted to communicate with a pressure chamber 42 disposed below assembly 31. Passage 40 is internally threaded for connection with piping or conduit leading to a source of fluid under pressure. Closure member 36 includes an upstanding annular shaped portion 44 which is closely received within a counter bore 46 formed in body 12. Portion 44 is grooved to carry an elastomeric O-ring 45 which functions for form a fluid seal between body 12 and closure member 36.

The upper end of body 16 is closed by a cap 48 which is connected to the upper end of body 16 by fasteners 50. Cap 48 includes a centrally disposed internal counter bore 52 and is also provided with an annular shaped depending portion 54 adapted to be closely received within a counterbore 56 formed at the upper end of body 12. Portion 54 if grooved to carry an elastomeric O-ring 58 which functions to form a fluid seal between body 12 and cap 48.

Disposed intermediate cap 48 and slide member 16 is a biasing means for yieldably resisting upward movement of assembly 31 within bore 14. In the present embodiment of the invention, this biasing means is provided in the form of an elongated coil spring 60 having an upper end disposed within counter bore 52 formed in cap 48 and a lower end disposed within counterbore 16a formed in member 16.

Carried within axially spaced apart grooves formed in the inner wall of bore 14 are pairs of upper and lower sealing means 70 and 72 respectively and a pair of central sealing means 74. In the embodiment of the invention shown in the drawings these sealing means comprise slipper seal assemblies generally designated by the numeral 77. Referring to FIG. 2 each seal assembly 77 comprises an elastomeric sealing element, or O-ring, 78 and a cooperative ring member 80 which is adapted to be carried between the slide assembly 31 and the O-ring 78. Ring member 80 can be constructed of various yieldably deformable, but durable, materials, such as polypropylene, polyethylene and other thermoplastics.

Turning again to FIG. 1, upper sealing means 70 comprises a pair of seal assemblies disposed on either side by an annular, radially extending vent passageway 81 interconnecting bore 14 with atmosphere. Similarly, sealing means 72 comprises a pair of seal assemblies disposed on either side of a lower radially extending vent passageway 82 interconnecting bore 14 with atmosphere. Passageways 81 and 82 function to vent to atmosphere any liquids which might leak past the sealing means during reciprocation of the slide assembly. To prevent atmospheric contamination, filter elements 84 are carried within each passageway 81 and 82.

Central sealing means 74 comprises first and second slipper seal assemblies 77a and 77b, each being of the character shown in FIG. 2. These assemblies are disposed on either side of an annular chamber 87 formed in body 12 which chamber is in communication with outlet passageway or port 20. When the slide assembly 31 is in the location shown in FIG. 1, assemblies 77a and 77b are located on either side of annular passageway 26 and assembly 77b is disposed slightly above annular passageway 30.

In operation, when the components parts of the valve assembly are in the locations shown in FIG. 1, the inlet port, or passageway 18 is blocked and annular passageway 30 and outlet passageway 20 are in communication with the vent port, or passageway, 22. However, when a pressure sufficient to overcome the urging of spring 60 is exerted on slide assembly 31 by fluids within chamber 42, the slide assembly will move upwardly within bore 14. Sufficient upward movement of the slide assembly will cause upper annular passageway 26 to move into communication with inlet passageway 18. Simultaneously, vent passageway 22 will be closed and lower annular passageway 30 will move into communication with chamber 87 and with outlet passageway 20. Fluid will then flow into the valve assembly through inlet 18, thence into upper annular passageway 26, thence downwardly through axial passageways 32 into lower annular passageway 30 and finally outwardly through outlet port 20. Slipper seal assembly 77b will function to prevent the flow of fluid between the slide assembly and the valve body. Upon a reduction of fluid pressure within chamber 42, spring 60 will once again urge the slide assembly into the position shown in FIG. 1.

Due to the unique manner by which the slide assembly of the invention is fabricated, the slide assembly will impart virtually no wear on the slipper seals as the slide assembly reciprocates within the valve body. This method of fabrication is accomplished as follows:

As a first step in the method, a first cylindrically shaped part is machined at either end to form an enlarged diameter cylindrically shaped central portion and spaced apart reduced diameter cylindrically shaped end portions. The end portions are machined so that radially extending shoulders are defined at either end of the central portion. Next, the central portion is bored in a manner to form a plurality of circumferentially spaced passageways extending axially through the central portion. A pair of hollow cylindrical sleeves are then formed in a manner such that the internal diameter of the sleeves is slightly larger than the outer diameter of the end portions and so that the outer diameter of the sleeves is approximately equal to the outer diameter of the central portion.

Next, the parts are assembled by placing the sleeves over the end portions of the first part so that the inner edges thereof are spaced slightly from the shoulders which define the ends of the enlarged diameter central portion. The parts are carefully held in this position and the sleeves are affixed to the first part as by bonding, electron beam welding or by other suitable means depending upon the materials used and the application to be made of the valve. After the parts have been thus assembled, the assemblage is precisely round and lapped so that the outside diameter of the assemblage is precisely uniform from end to end, thereby ensuring that no steps or enlarged diameter portions remain which could abrade or wear upon the seals carried by the valve body.

Turning now to FIG. 4, the form of the invention thereshown includes a valve body made up of threadably interconnected male and female parts 90 and 92 respectively. Part 90 includes an axial bore 94 in which a valve item or slide member 91 is operative. Parts 90 and 92 have coaxially aligned fluid inlet and outlet passages designated by the numerals 98 and 100 respectively. These passages are formed by walls which are threaded, as shown, for connection to piping or conduit.

The slide member 96 is of generally round cross section having a first counter bore 96a and an enlarged diameter second counter bore 96b. Part 96 has a reduced diameter portion 96c defining a shoulder 96d. Affixed to reduced diameter portion 96c as by electron beam welding or other suitable means to form a slide assembly 97 is a ring shaped member 102. The outermost radial portion 102a of ring 102 is disposed in close proximity with shoulder 96d so as to form an annular passageway 104 between portion 102a of sleeve 102 and shoulder 96d. Ring 102 is provided with a plurality of circumferentially spaced passageways 106, the purpose of which will presently be described.

Extending axially inwardly from the left end portion 96e of slide member 96 are a plurality of circumferentially spaced passageways 108, the inner ends 108a of which are in communication with an annular groove 110 formed in axial bore 94 of part 90.

Carried within an annular groove 112 formed in part 90 intermediate groove 110 and the inner, or right, end of part 90 is a sealing means comprising a resilient O-ring 114 which is adapted to sealably engaging slide member 96 to prevent the passage of fluid between the slide member and part 90. Sealing means comprising elastomeric O-rings 116 and 118 are also carried within grooves formed in part 92 for sealable engagement with part 90 to prevent leakage of fluid between parts 90 and 92.

Part 90 is provided with a second reduced diameter bore 120 which is disposed in communication with bore 94. Mounted within this bore 120 is a support member 122 having a chamber 124 which is in communication with outlet 100 and also is in communication with a plurality of axially extending fluid passageway 126 formed in member 122. Support member 122 also has a central portion 122a having an axially extending bore 128 formed therein.

Disposed intermediate support member 122 and slide assembly 97 is a biasing means for yieldably resisting movement of assembly 97 inwardly, or to the left, within bore 94. In the present embodiment of the invention, this biasing means is provided in the form of an elongated coil spring 130 having one end disposed within counterbore 96a formed in part 96 and a second end disposed within bore 128 formed in support member 122.

In operation, when the component parts of the valve assembly are in the locations shown in FIG. 4, annular passageway 104 is blocked preventing fluid flow between inlet 98 and outlet 100. However, when a pressure sufficient to overcome the urging of spring 130 is exerted on slide assembly 97 by fluids entering the valve through inlet 98, the slide assembly will move to the left within bore 94. Sufficient movement of the slide assembly will cause annular passageway 104 to move into communication with annular groove 110. Fluid from inlet 98 will then flow into axial passageways 106, thence into annular passageway 104, and thence into annular groove 110. Since groove 110 remains in communication with passageways 108, fluid will flow into these passageways into counterbore 94, thence into passageways 126 formed in support member 122 and finally into outlet port 100 through chamber 124.

When the pressure equalizes within the assembly, or if the inlet pressure drops, spring 130 will urge slide assembly to the right into the position shown in FIG. 4 wherein annular passageway 14 will once again become blocked.

Having now described the invention in detail in accordance with the requirements of the patent statutes, those skilled in this art will have no difficulty in making changes and modifications in the individual parts of their relative assembly in order to meet specific requirements or conditions. Such changes and modifications may be made without departing from the scope and spirit of the invention, as set forth in the following claims.

I claim:

1. A method of making a fluid flow controlling slide member adapted for slidable movement within a valve body of the character having a cylindrical bore adapted to closely receive the slide member and including fluid inlet and outlet ports in communication with the bore, said method comprising the steps of:
   (a) forming a first part in a manner to have a first cylindrical portion and an enlarged diameter second cylindrical portion defining a radially extending shoulder therebetween;
   (b) forming a cylindrically shaped hollow sleeve having an inner diameter slightly larger than the outer diamter of said first cylindrical portion, an outer diameter equal to the outer diameter of said second cylindrical portion and an annular shaped edge; and
   (c) affixing said sleeve to said first cylindrical portion of said first part with said annular shaped edge disposed in close proximity with said radially extending shoulder to define a circumferentially fluid carrying groove therebetween.

2. A method as defined in claim 1 including an interim step prior to affixing said sleeve to said first part, said interim step comprising forming at least one axially extending bore in said second cylindrical portion in a manner such that one end of said bore terminates in an open end at said radially extending shoulder.

3. A method as defined in claim 1 in which said sleeve is affixed to said first part by electron beam welding.

* * * * *